United States Patent
Sugiyama

[19]

[11] Patent Number: 5,921,049
[45] Date of Patent: *Jul. 13, 1999

[54] DEVICE FOR FORMING FRAMEWORK OF WOODEN BUILDING

[75] Inventor: Kazuo Sugiyama, Hiroshima, Japan

[73] Assignee: West Company Limited, Hiroshima, Japan

[ * ] Notice: This patent is subject to a terminal disclaimer.

[21] Appl. No.: 08/966,459

[22] Filed: Nov. 7, 1997

[30] Foreign Application Priority Data

Nov. 20, 1996 [JP] Japan ..................................... 8-326220

[51] Int. Cl.⁶ ................................................. E04H 12/08
[52] U.S. Cl. ...................... 52/653.1; 52/655.1; 52/656.9; 52/656.1; 52/702; 52/704; 52/263; 403/307; 403/300; 403/230; 403/234
[58] Field of Search ............................... 52/656.9, 653.1, 52/655.1, 656.1, 656.2, 702, 704, 263; 403/307, 300, 230, 233, 234

[56] References Cited

U.S. PATENT DOCUMENTS

| | | |
|---|---|---|
| 65,970 | 6/1867 | Wardwell . |
| 832,133 | 10/1906 | Lanz . |
| 1,245,537 | 11/1917 | Van Fleet . |
| 2,106,084 | 1/1938 | Coddington . |
| 3,429,092 | 2/1969 | Perry et al. . |
| 3,817,005 | 6/1974 | Rannefeld . |
| 3,820,293 | 6/1974 | Ohe et al. . |
| 4,068,332 | 1/1978 | Ball et al. ..................................... 5/296 |
| 4,261,155 | 4/1981 | Gilb . |
| 4,558,968 | 12/1985 | Meicki ..................................... 403/174 |
| 5,044,137 | 9/1991 | Shigeru et al. ............................ 52/286 |
| 5,062,733 | 11/1991 | Cholid et al. . |
| 5,242,239 | 9/1993 | Hosokawa ................................. 403/258 |
| 5,253,945 | 10/1993 | Hosokawa ................................. 403/258 |
| 5,284,311 | 2/1994 | Baer ......................................... 248/243 |
| 5,295,754 | 3/1994 | Kato ......................................... 403/174 |
| 5,342,138 | 8/1994 | Saito et al. . |
| 5,438,811 | 8/1995 | Goya . |
| 5,469,678 | 11/1995 | Zamerovsky . |
| 5,577,856 | 11/1996 | Tezuka . |
| 5,727,358 | 3/1998 | Hayashi et al. ......................... 52/745.2 |

FOREIGN PATENT DOCUMENTS

2 647 861  12/1990  France .
619 216  3/1961  Italy .

*Primary Examiner*—Carl D. Friedman
*Assistant Examiner*—Yvonne Horton-Richardson
*Attorney, Agent, or Firm*—Flynn, Thiel, Boutell & Tanis, P.C.

[57] ABSTRACT

A device for forming a framework of a wooden building includes a steel made square tube which is capable of tightly receiving a top portion of a post in a lower portion of the tube and a bottom portion of another post in an upper portion of the tube. The device also includes a joint which has a belt-shape base portion situated in the vertical direction and a flange portion projecting perpendicularly from the center of the base portion. The device further comprises a bolt and joint stick. The bolt attaches the base portion of the joint to the square tube. The joint stick passes through a hole of a transverse lumber and an opening of the flange portion of the joint, while the flange portion is inserted in a slit at the edge portion of the transverse lumber.

11 Claims, 7 Drawing Sheets

DEVICE FOR FORMING FRAMEWORK OF WOODEN BUILDING

BACKGROUND OF THE INVENTION

1. Field of the Invention

The present invention relates to an improved device for forming a framework of a wooden building, which comprises a wooden post and a transverse lumber or member such as a ground still, beam or girth.

As a means for joining a post with a transverse lumber, e.g., a ground still or beam, easily and smoothly, there exists a device which is composed of a steel plate or steel bar.

However, the above-described conventional device has a drawback. That is, a framework formed with the conventional device tends to lack mechanical strength since a post has to be provided with a large cut or notch in order to join a transverse lumber therewith.

SUMMARY OF THE INVENTION

In view of the foregoing, an object of the present invention is to provide an improved device for forming a framework of a wooden building, which does not require a post to have a large cut or notch, thus achieving higher mechanical strength in the framework.

According to a first aspect of the present invention, there is provided a device for forming a framework of a wooden building, comprising a steel made square tube which is capable of tightly receiving a top portion of a lower post with a lower opening, and a bottom portion of an upper post with an upper opening; a joint having a belt-shape base portion situated in the vertical direction and a flange portion projecting perpendicularly from the center of the base portion; a bolt for screwing the base portion of the joint to the square tube; and a joint stick which passes through a hole of a transverse lumber and an opening of the flange portion of the joint, while the flange portion is inserted in a slit at the edge portion of the transverse lumber.

According to a second aspect of the present invention, a joint is provided with a pair of flange portions instead of a single flange portion. Each flange portion projects from each side edge of a belt-shape base portion.

According to a third aspect of the present invention, there is provided a device for forming a framework of a wooden building, comprising a steel made square tube which is capable of tightly receiving a top portion of a lower post and a bottom portion of an upper post; a joint having a belt-shape base portion situated in the vertical direction and a flange portion having at least one opening projecting perpendicularly from the center of the base portion, wherein the flange portion has a notch at the upper edge thereof above an upper opening, making a pass to the upper opening; a bolt for screwing the base portion of the joint to the square tube; and a joint stick which passes through a hole of a transverse lumber and the opening of the flange portion of the joint, while the flange portion is inserted in a slit at the edge portion of the transverse lumber.

According to a fourth aspect of the present invention, a joint is provided with a pair of flange portions instead of a single flange portion. Each flange portion projects from each side edge of a belt-shape base portion. Further, each flange portion has a notch at the upper edge thereof above an upper opening, making a pass to the upper opening.

According to a fifth aspect of the present invention, there is provided a device for forming a framework of a wooden building, which further comprises a supporter. The supporter is composed of a reversed-U shape main body and a pair of wings. Each wing projects from each side edge of the main body in the transverse direction. The wings support a transverse lumber from underneath the lumber while the reversed-U shape main body is hooked on the upper edge of a window of the flange portion.

According to the present invention, a framework of a wooden building can be formed without making a large cut or notch through a post, providing a framework having higher mechanical strength compared to that formed with the conventional device. Further, the device is composed of a few simple parts and they easily fit with each other at a construction site, so a framework of a wooden building can be easily and smoothly formed.

BRIEF DESCRIPTION OF THE DRAWINGS

The above and other objects, features and advantages of the present invention will become more apparent from the following description taken in connection with the accompanying drawings, in which.

DESCRIPTION OF PREFERRED EMBODIMENT

An embodiment of the present invention will now be described in detail referring to FIGS. 1 to 6.

Figure 4:
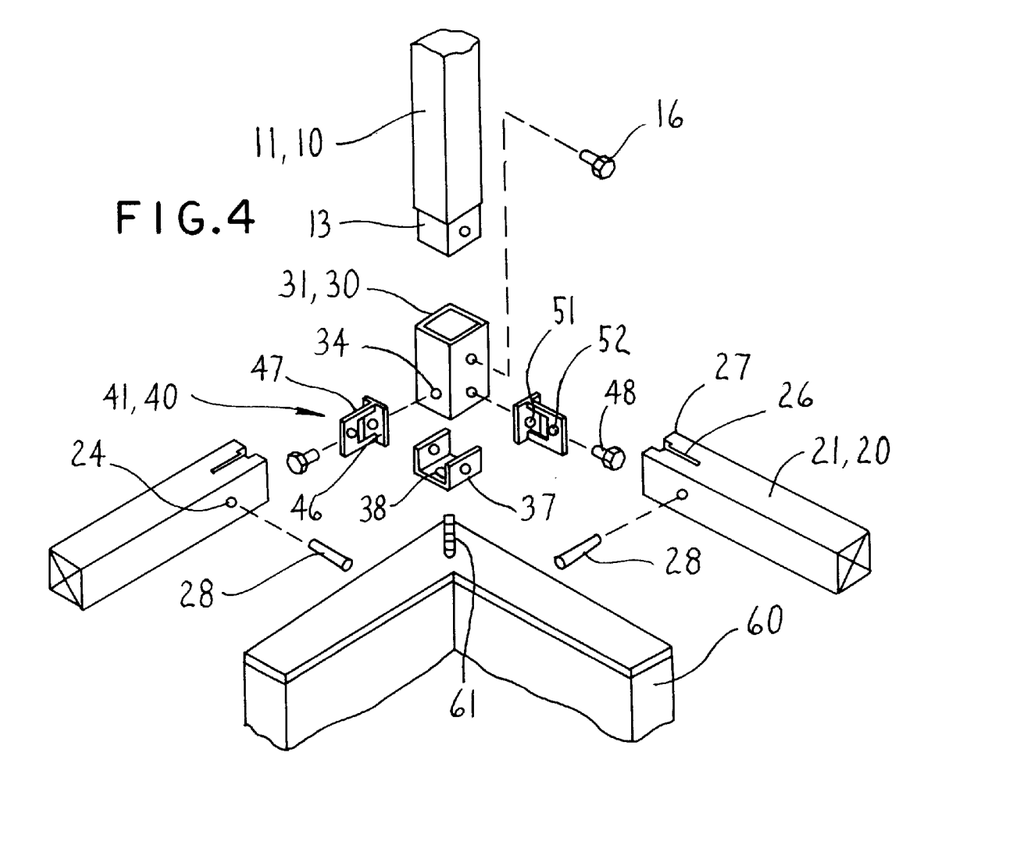
FIG. 4 is an exploded partial perspective view of a framework of a wooden building formed with a device according to a first aspect of the present invention as indicated by bracket "C" in FIG. 1.
Figure 5:
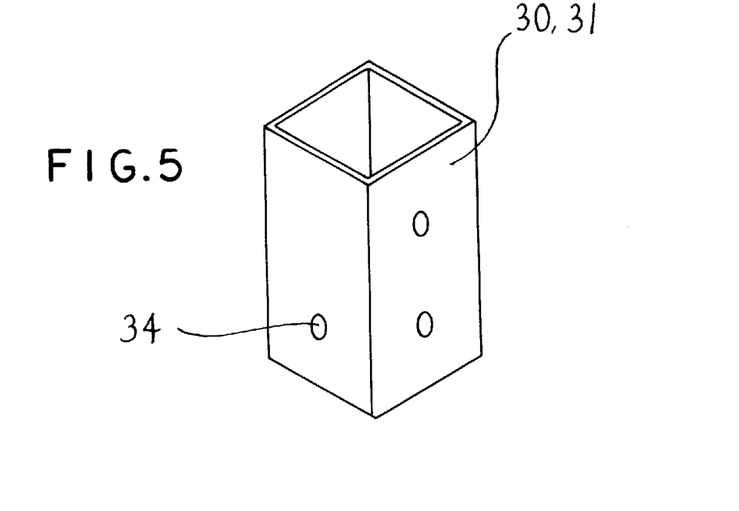
FIG. 5 is a perspective view of a steel made square tube of a device according to the present invention.

According to this embodiment, as illustrated in FIG. 4, a framework of a wooden building is provided with a stud bolt 61 which is projected in the upward direction from the footing 60. A metal fitting 37 is fastened on the footing 60 with a combination of the stud bolt 61 and a nut, while the stud bolt 61 is placed in an oval opening 38 of the metal fitting 37.

A joint 40 (a lower joint 41, middle joint 42 and upper joint 43 are also referred to as the "joint 40") is composed of a belt-shape base portion 46 positioned in the vertical direction against a post 10 and a flange portion 47 projecting perpendicularly from the vertical center line of the base portion 46. The flange portion 47 is provided with a window 50 at the portion adjacent to the base portion 46. The belt-shape base portion 46 is provided with an opening 51 adjacent to the window 50, which leads to the window 50. The lower steel made (or metal) square tube 31 (the lower steel made tube 31, middle steel made tube 32 and upper steel made tube 33 are also referred to as the "steel made tube 30") and the lower joint 41 are secured to the metal fitting 37 previously secured to the footing 60 as a bolt or fastener 48 is fastened to the metal fitting 37 while the bolt 48 is gone through the opening 51 of the lower joint 41, the lower opening 34 of the lower square tube 31 and an opening of the metal fittings 37 in this sequence.

There is provided a slit 26 at the edge surface of a ground still 21 in order to receive a flange portion 47 of the lower joint 41 (the ground still 21, girth 22 and tie beam 23 are also referred to as the "transverse lumber 20"). There is also provided a groove 27 at the edge surface of the ground still 21 in order to prevent interference between the edge surface of the ground still 21 and a bolt head 48.

The ground still 21 is secured to the lower square tube 31 such that a joint stick or elongate fastening member 28 is tightly inserted into a hole 24 of the ground still 21 and an opening 52 of the flange portion 47 of the lower joint 41 while the ground still 21 is adjusted to the lower square tube 31.

A first floor post 11 (the first floor post 11 and second floor post 12 are also referred to as the "post 10") is secured to the lower square tube 31 such that the lower slender edge portion 13 of the first floor post 11 is tightly inserted into the upper portion of the lower square tube 31, and subsequently, a bolt 16 is passed through an opening 34 of the lower square tube 31 and is screwed to the lower square tube 31.

Figure 3:
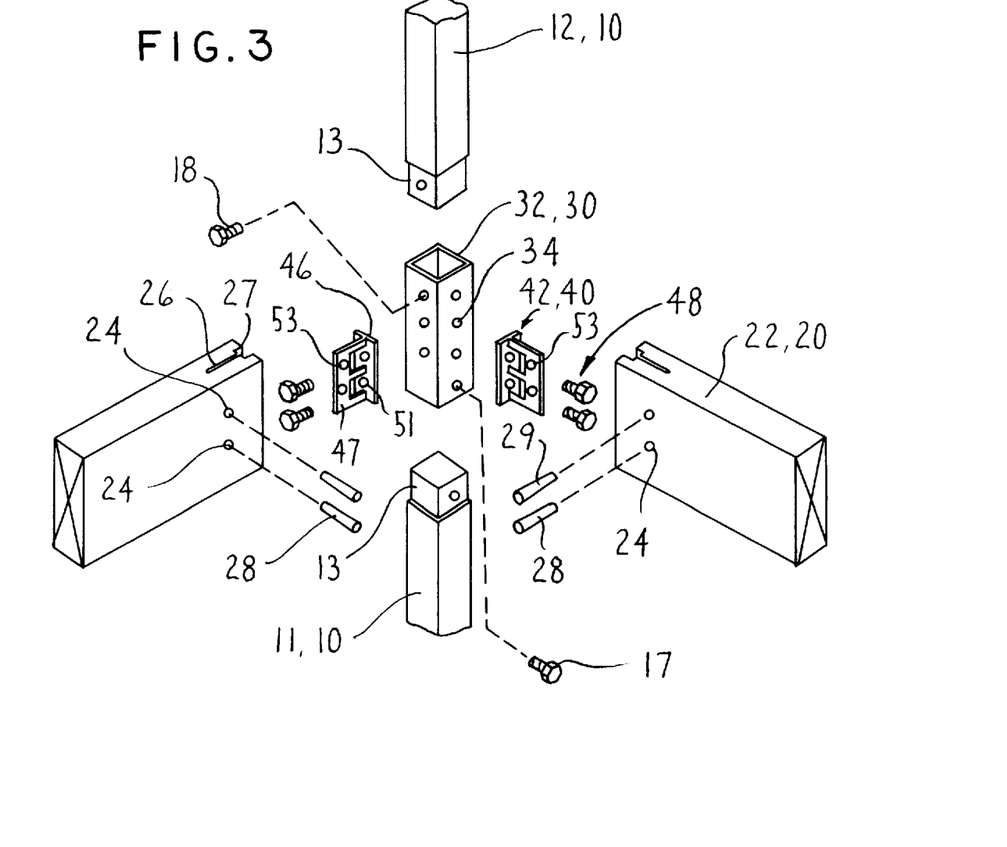
FIG. 3 is an exploded partial perspective view of a framework of a wooden building formed with a device according to a first aspect of the present invention as indicated by bracket "B" in FIG. 1.

As particularly illustrated in FIG. 3, a middle square tube 32 is attached on the upper slender edge portion 13 of the first floor post 11 at the lower portion thereof, and the middle square tube 32 is firmly secured to the top of the first floor post 11 with a bolt 17.

A middle joint 42 is secured to the side wall of the middle square tube 32 with a bolt 48. A girth 22 is secured to the middle joint 42 with joint sticks 28, 29 in the manner similar to that the ground still 21 is secured to the lower joint 41. Either pins or bolts are used as the joint sticks 28, 29.

Figure 1:
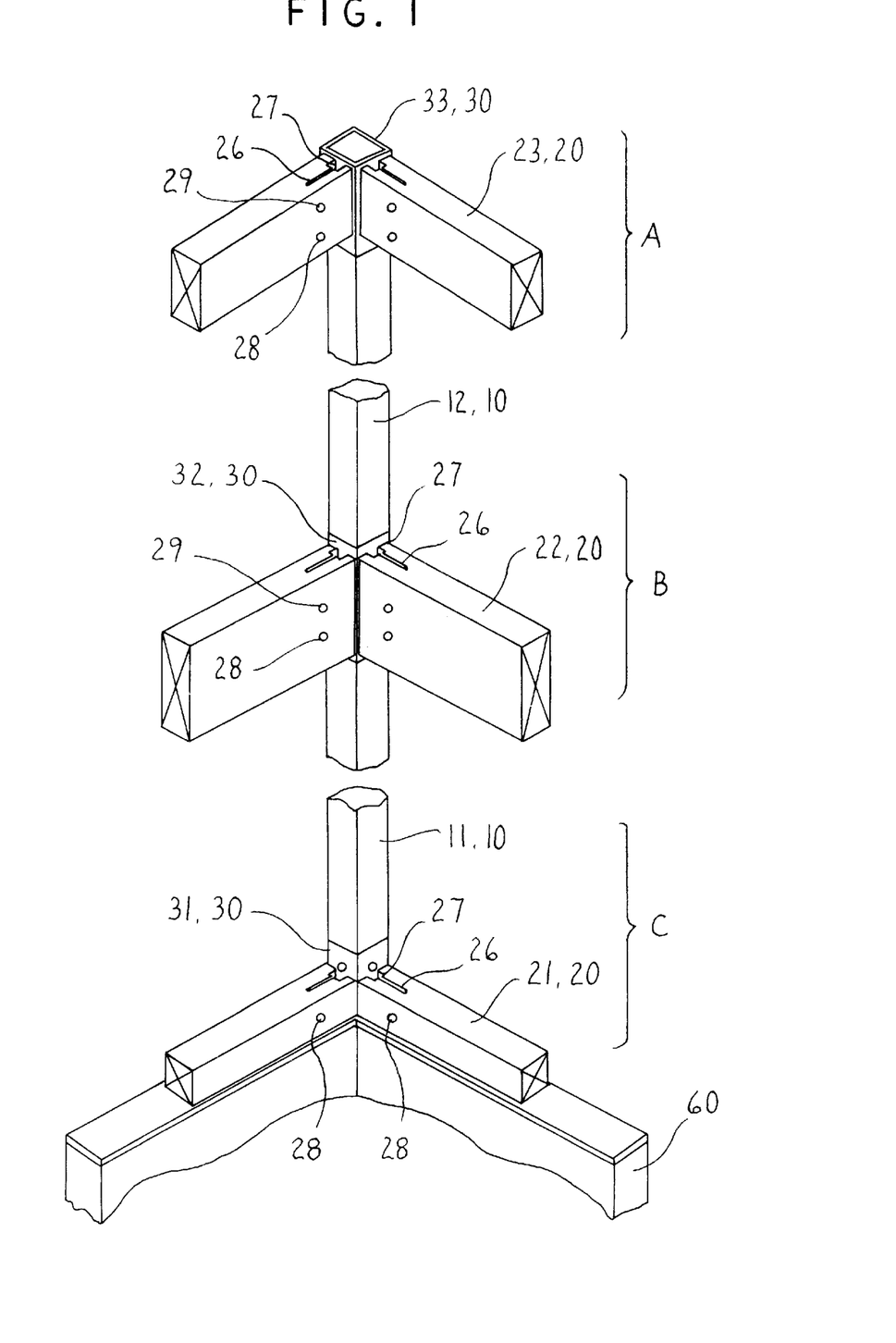
FIG. 1 is a schematic perspective view of a framework of a wooden building formed with a device according to a first aspect of the present invention.
Figure 2:
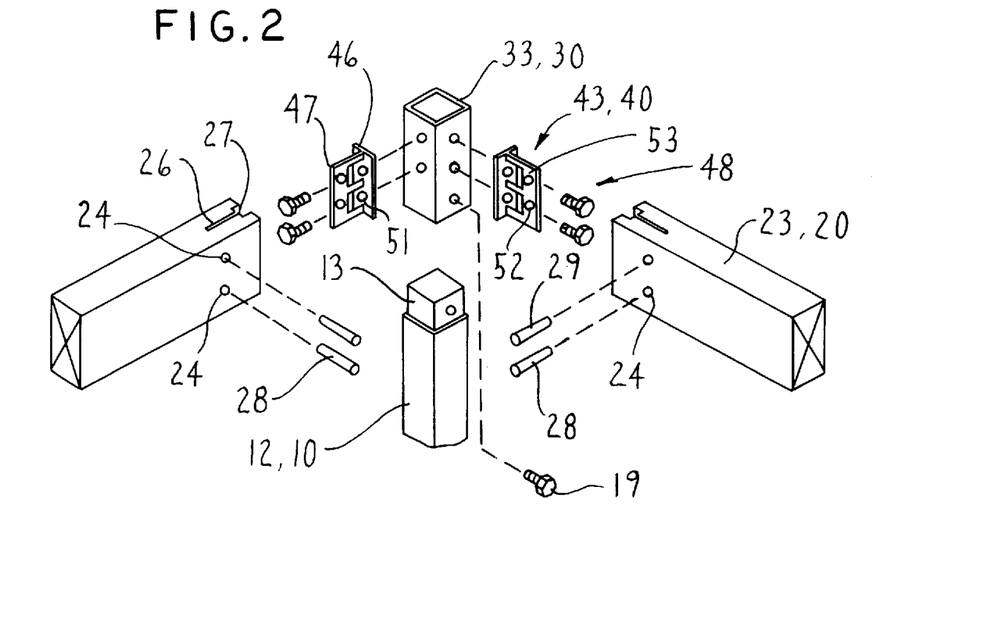
FIG. 2 is an exploded partial perspective view of a framework of a wooden building formed with a device according to a first aspect of the present invention as indicated by bracket "A" in FIG. 1.

A second floor post 12 is secured to the middle square tube 32 with a bolt 18 in the manner similar to that the first floor post 11 is secured to the lower square tube 31. An upper square tube 33 is attached on the upper portion of the second floor post 12 with a bolt 19 in the manner similar to the case the middle square tube 32 is attached. Further, an upper joint 43 is secured to the upper square tube 33 with bolts in the manner similar to the case of the middle joint 42. Finally, a tie beam 23 is secured to the upper joint 43 in the manner similar to that the a girth 22 is secured to the middle joint 42.

As illustrated in FIGS. 10 to 13, a joint 40 may be provided with two flange portions 47 instead of having a single flange portion 47 as illustrated in FIGS. 2 to 4, 6 and 8. Each flange portion 47 projects from each corresponding side edge of a base portion 46.

Figure 6:
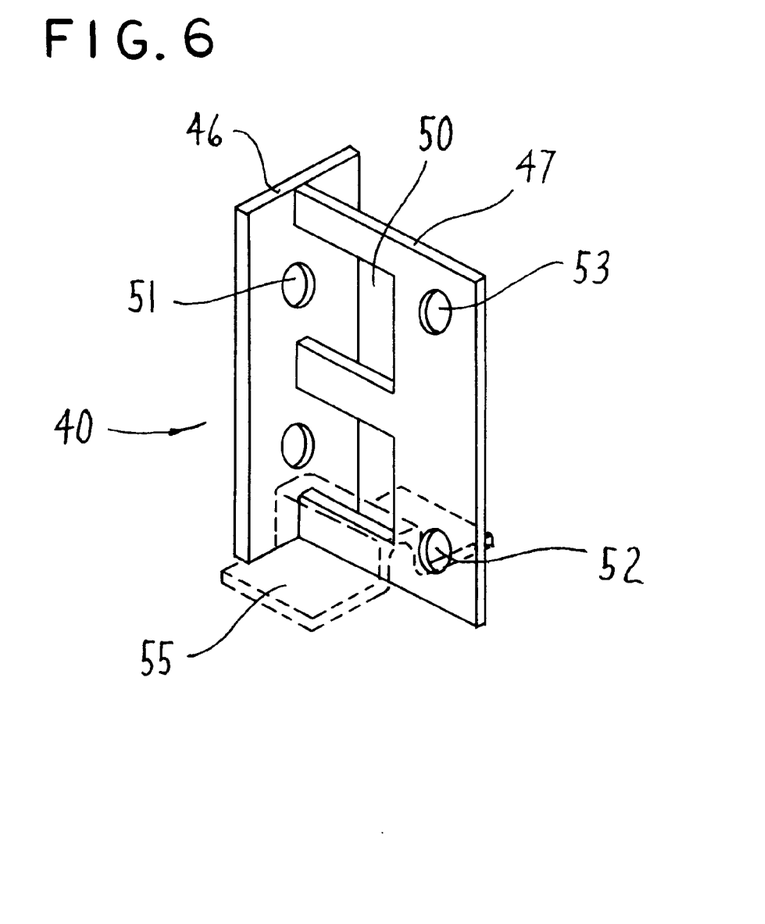
FIG. 6 is a perspective view of a joint of a device according to the present invention.
Figure 8:
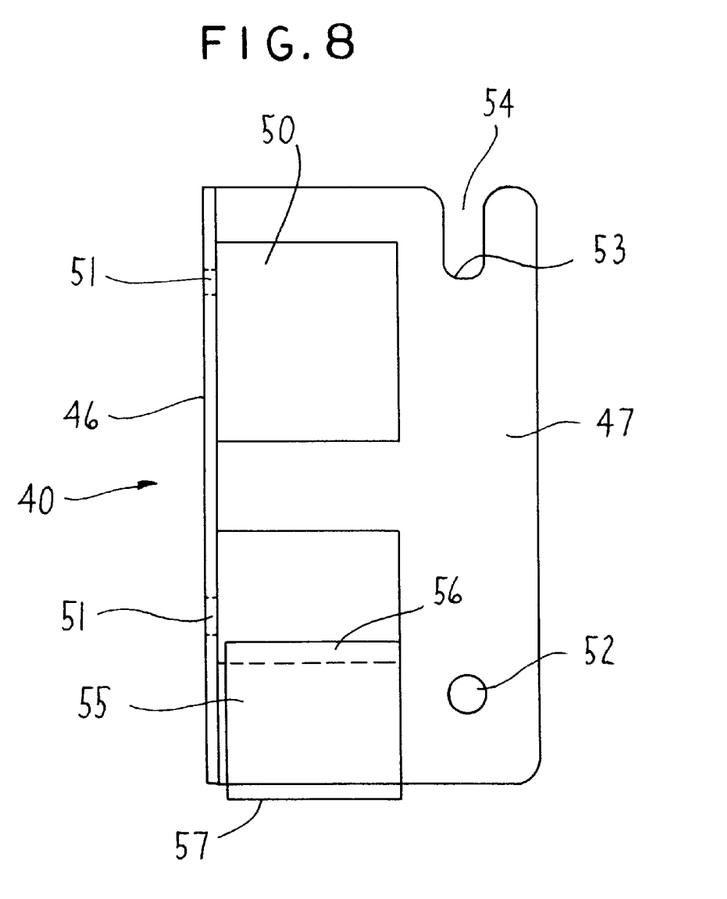
FIG. 8 is a side view of a combination of a joint and a supporter of a device according to the present invention.
Figure 9:
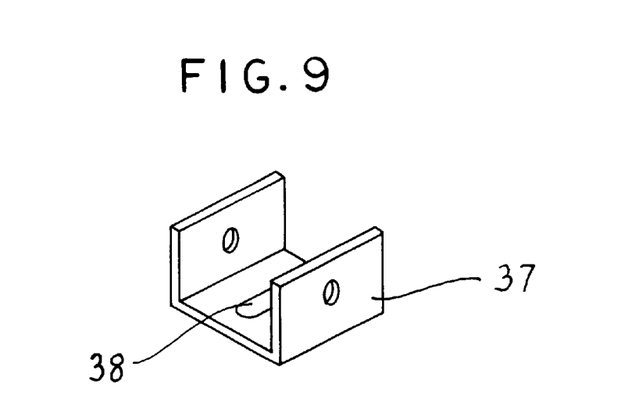
FIG. 9 is a perspective view of a metal fitting of a device according to the present invention.
Figure 10:
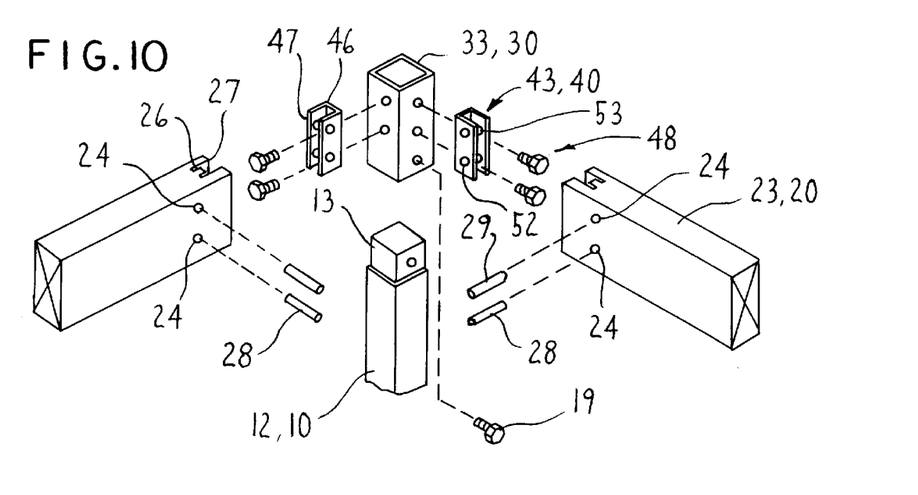
FIG. 10 is an exploded partial perspective view of a framework of a wooden building formed with a device according to a second aspect of the present invention corresponding to bracket "A" in FIG. 1.
Figure 11:
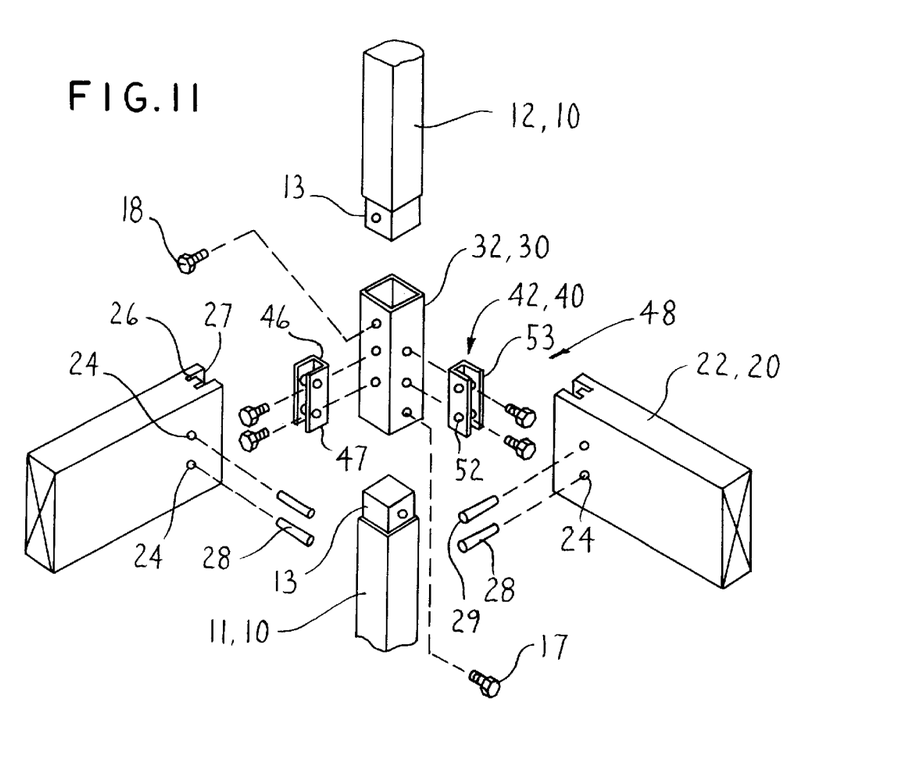
FIG. 11 is an exploded partial perspective view of a framework of a wooden building formed with a device according to a second aspect of the present invention corresponding to bracket "B" in FIG. 1.
Figure 12:
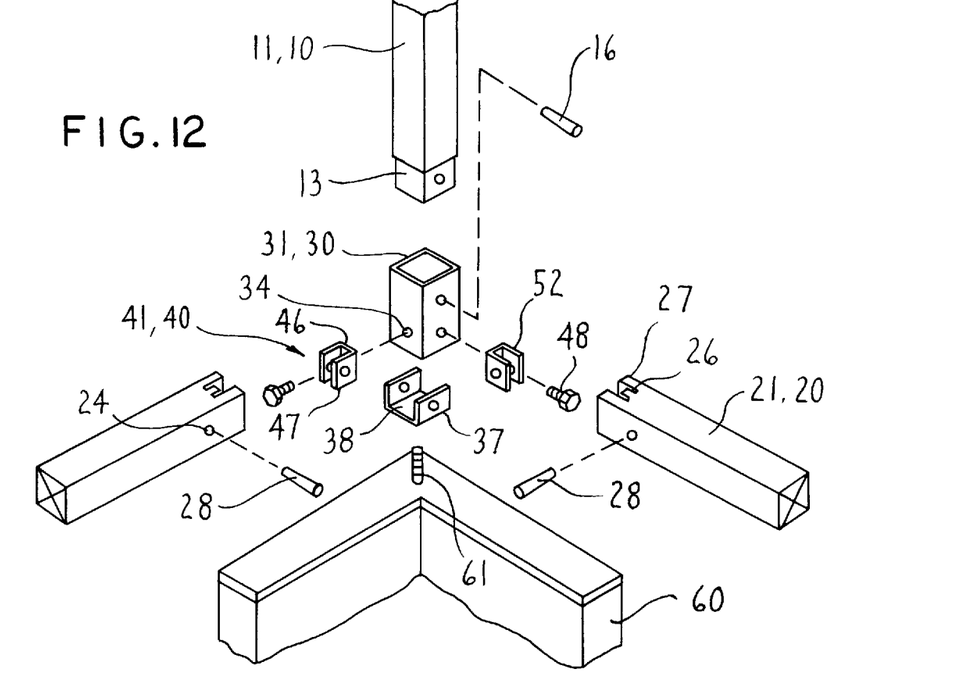
FIG. 12 is an exploded partial perspective view of a framework of a wooden building formed with a device according to a second aspect of the present invention corresponding to bracket "C" in FIG. 1.
Figure 13:
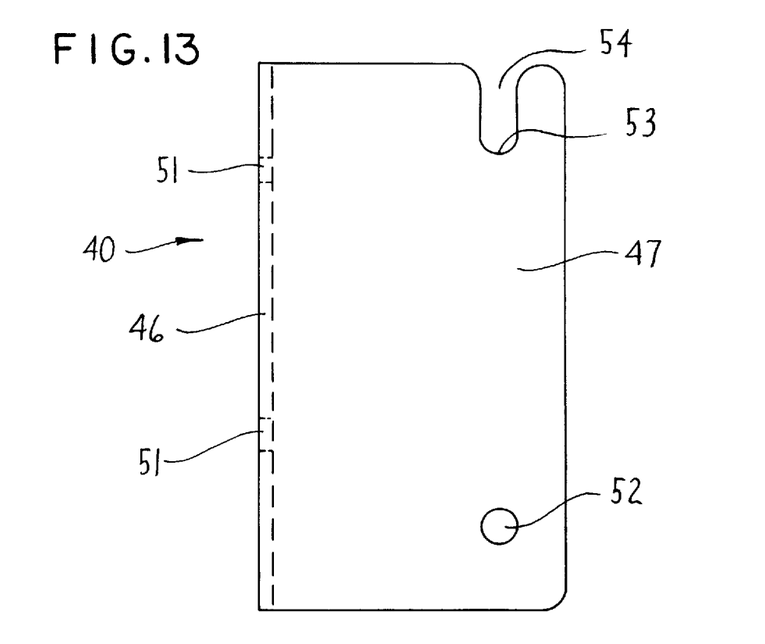
FIG. 13 is a side view of a joint of a device according to a second aspect of the present invention.

As illustrated in FIG. 8, the flange portion 47 of a joint 40 may be provided with a notch 54 above an upper opening 53 instead of having two separate openings 52, 53 as illustrated in FIG. 6. The notch 54 makes a larger notch in combination with the upper opening 53 (i.e. notch 54 is an upwardly opening notch). Through use of the joint 40 having a notch 54, a joint stick 29 can be inserted into a hole 24 of a transverse lumber 20 before the transverse lumber 20 is adjusted to a square tube 30. The transverse lumber 20 is supported by the joint 40 as the joint stick 29 previously inserted into the hole 24 of the transverse lumber 20 can be inserted into the opening 53 through the notch 54, and the joint stick 29 is supported by the bottom surface of the opening 53. The transverse lumber 20 can be supported in such a condition as described above where the transverse lumber 20 does not drop even if it is not supported by hands, and a lower joint stick 28 can be inserted into a lower opening 52.

Figure 7:
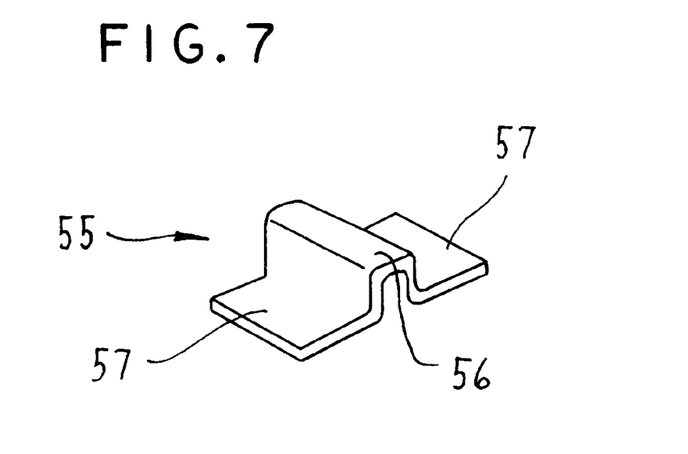
FIG. 7 is a perspective view of a supporter of a device according to the present invention.

As illustrated in FIGS. 6 to 8, a device according to the present invention may further comprise a supporter 55. The supporter 55 in this embodiment is composed of a reversed-U shape main body 56 and a pair of wings 57 which are formed on both sides of the main body 56 are bent and protruded in the horizontal direction. By placing this supporter 55 in the manner as illustrated in FIGS. 6 and 8, where the reversed-U shape main body 56 of the supporter 55 rides on the bottom edge of a lower window 50, each of the joint sticks 28, 29 can be inserted into either one of openings 52, 53 of a joint 40 and subsequently holes 24 of a transverse lumber 20, while the transverse lumber 20 is supported by the wings 57 of the supporter 55.

The present invention is not limited to the above-described embodiments. The above-described embodiment is a mere example, and those being substantially the same as described in the appended claims and providing similar action and effects are included in the scope of the present invention.

What is claimed is:

1. A device for forming a framework of a wooden building comprising:

a square metal tube configured for tightly receiving a top portion of a lower post within a lower opening of the tube, and a bottom portion of an upper post within an upper opening of the tube;

a joint having a generally flat base portion situated in the vertical direction against a side surface of the square metal tube and a flange portion having at least one opening therein, the flange portion projecting perpendicularly from a center of the base portion;

a first fastener for attaching the base portion of the joint to the side surface of the square tube; and a fastener extending through a hole of a transverse member and the opening of the flange portion of the joint, the flange portion being inserted in a slit at an edge portion of the transverse member.

2. A device for forming a framework of a wooden building comprising:

a square metal tube configured for tightly receiving a top portion of a lower post within a lower opening of the tube, and a bottom portion of an upper post within an upper opening of the tube;

a joint having a generally flat base portion situated in the vertical direction against a side surface of the tube and a pair of flange portions each having at least one opening therein, each flange portion projecting perpendicularly from a side edge of the base portion;

a first fastener for attaching the base portion of the joint to the side surface of the square tube; and a second fastener extending through a hole of a transverse member and the opening of each said flange portion of the joint, the flange portions being inserted into corresponding slits at an edge portion of the transverse member.

3. A device for forming a framework of a wooden building claimed in claim 1, including a supporter having a reversed-U shaped main body and a pair of wings, each wing projecting from a side edge of the main body in a transverse direction, the wings supporting the transverse member from underneath while the reversed-U shaped main body is supported on an upper edge of a window of the flange portion.

4. A device for forming a framework of a wooden building claimed in claim 2, including a supporter having a reversed-U shaped main body and a pair of wings, each wing projecting from a side edge of the main body in a transverse direction, the wings supporting the transverse member from underneath while the reversed-U shaped main body is supported on upper edges of windows of the respective flange portions.

5. A device for forming a framework of a wooden building according to claim 1, wherein the opening of the flange portion is a lower opening, and the flange portion has an upwardly opening notch at an upper edge thereof above the lower opening.

6. A device for forming a framework of a wooden building claimed in claim 5, including a supporter having a reversed-U shaped main body and a pair of wings, each wing projecting from a side edge of the main body in a transverse direction, the wings supporting the transverse member from underneath while the reversed-U shaped main body is supported on an upper edge of a window of the flange portion.

7. A device for forming a framework of a wooden building according to claim 2, wherein the openings of the flange portions are lower openings, and each of the flange portions include an upwardly opening notch at an upper edge thereof above the respective lower opening.

8. A device for forming a framework of a wooden building claimed in claim 7, including a supporter having a reversed-U shaped main body and a pair of wings, each wing projecting from a side edge of the main body in a transverse direction, the wings supporting the transverse member from underneath while the reversed-U shaped main body is supported on upper edges of windows of the respective flange portions.

9. A device for forming a framework of a building comprising:

a four-sided metal tube having a pair of open ends, at least one of said open ends being configured for receiving an end of an upright post therein;

a generally horizontally extending transverse member having a generally vertically extending slit in an edge portion thereof and a hole opening at a side surface thereof;

a connector joint oriented in a generally vertical direction for fastening the transverse member and the metal tube to one another, the joint having a base portion disposed against a side of the metal tube and at least one flange portion projecting generally perpendicularly from the base portion, the flange portion having at least one opening therein and being disposed within the slit of the transverse member;

a first fastener for attaching the base portion to said side of the metal tube; and a second fastener extending through the hole of the transverse member and the opening of the flange portion.

10. A device for forming a framework of a building according to claim 9, wherein the connector joint includes a pair of said flange portions each having at least one said opening therein and projecting generally perpendicularly from a respective side edge of the base portion, the second fastener extending through the opening of each flange portion, the transverse member having a pair of said slits at the edge portion thereof and each flange portion being disposed in a respective one of the slits.

11. A device for forming a framework of a building according to claim 9, wherein the opening of the flange portion is a lower opening, and the flange portion has an upwardly opening notch at an upper edge thereof above the lower opening.

* * * * *